United States Patent [19]

McFarlane

[11] 4,124,675

[45] Nov. 7, 1978

[54] PROCESS OF INSERT MOLDING OF TEFLON TUBE AND PLASTIC BODY

[76] Inventor: Richard H. McFarlane, 2571 Kaneville Rd., Geneva, Ill. 60134

[21] Appl. No.: 876,926

[22] Filed: Feb. 10, 1978

[51] Int. Cl.² .......................... B29C 17/02; B29D 9/00
[52] U.S. Cl. .................................... 264/249; 264/294; 264/322
[58] Field of Search ................ 264/249, 320, 322, 294

[56] References Cited

U.S. PATENT DOCUMENTS

| 3,418,409 | 12/1968 | Hesse et al. | 264/322 |
| 3,545,168 | 12/1970 | Day | 264/322 |
| 3,843,300 | 10/1974 | McFarlane | 264/322 |

*Primary Examiner*—W.E. Hoag

[57] ABSTRACT

A process of molding a teflon tube to a plastic body which includes the steps of jacketing an end zone of a tube of teflon with a sleeve of plastic and with a portion of the teflon extending from the sleeve and heating the extending zone of the teflon so that in response to the heat the teflon curls about the plastic forming a mechanical lock and molding plastic about the plastic sleeve at the end to form a bond and mechanical lock.

7 Claims, 5 Drawing Figures

U.S. Patent        Nov. 7, 1978        4,124,675
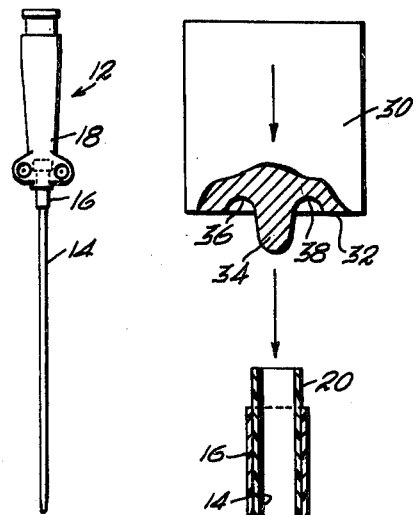
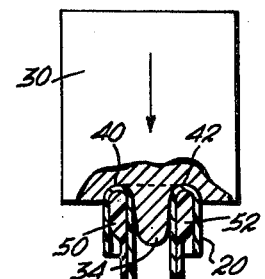
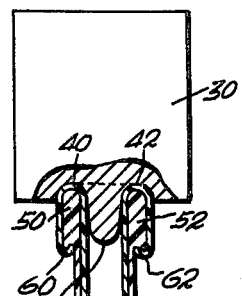
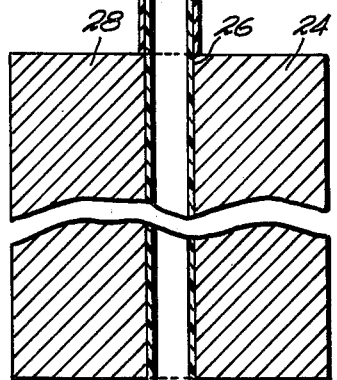
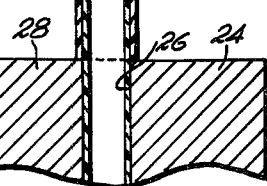
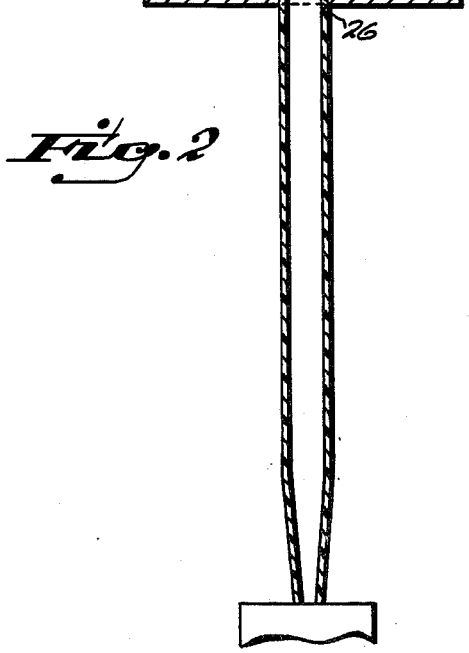
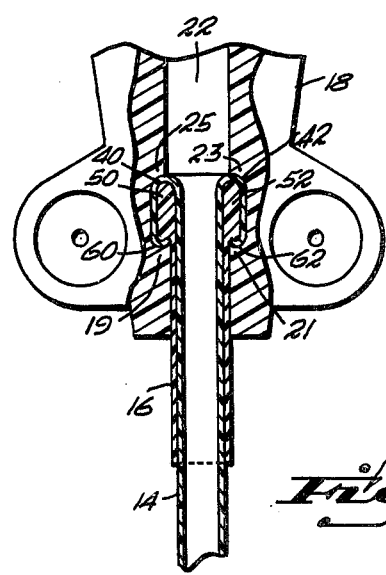

PROCESS OF INSERT MOLDING OF TEFLON TUBE AND PLASTIC BODY

FIELD OF THE INVENTION

A process for molding a teflon tube to a plastic body.

BACKGROUND OF THE INVENTION

As is perhaps well known, it is quite often difficult to mold teflon to plastic material because the same do not bond together. This invention is of a process whereby a tube of teflon may be connected to a plastic body by molding and wherein a plastic sleeve is utilized and from which plastic sleeve the teflon tube to be molded to a plastic body extends in a first step of the operation and the extending end is heated causing the teflon to turn back upon itself over the end of the plastic sleeve forming a mechanical lock and, subsequently, the plastic sleeve which is mechanically locked to the teflon is insertmolded with a plastic body forming a strong two-part molded teflon and plastic body.

It is, generally speaking, an object of this invention to provide an improved process of insert molding a teflon tube and plastic body together.

In accordance with these and other objects, the instant invention will now be described with reference to the accompanying drawings in which:

DESCRIPTION OF THE DRAWINGS

FIG. 1 is an elevation view of a catheter placement assembly;

FIG. 2 is a view in cross section illustrating a first step in the operation of the instant method;

FIG. 3 is a partial view in cross section indicating a second stage of the practice of the method described herein;

FIG. 4 is a view similar to FIGS. 2 and 3 and illustrating another stage of the practice of the method of the instant invention;

FIG. 5 is a view in cross section of the zone of connection of the parts 14 and 18 shown in FIG. 1.

DESCRIPTION OF PREFERRED EMBODIMENT

The instant invention is of a method for connecting a plastic body to material known as Teflon, in what may be regarded, generally, as a telescopic connection.

Referring to FIG. 1, the end of the tubular length of Teflon is designated by the numeral 14. It is to be telescopically connected to a plastic body 18 to form a fluid flow path through a zone of connection of the Teflon tube and the body. The method is useful, for example, in the manufacture of catheter assemblies, one of which is designated by the numeral 12 in FIG. 1.

Referring now to FIGS. 2, 3 and 4 the method will be described. The proximal end zone of a tubular length of Teflon 14, such as the end of a catheter, is held in place by a pair of jaws 24 and 28 through which a passageway 26 is defined. An end zone length 20 of the Teflon catheter extends out of the passageway defined by the jaws. Over the extending length, a plastic sleeve 16 which may be of polypropylene, is positioned, which is of an axial length less than that of the extending length of the Teflon, so that a terminal end zone of the Teflon tube extends outwardly of the sleeve. Thereafter, with the catheter held in a fixed axial position, a heated tool 30 is advanced. The tool has an axially extending symmetrical nose 34 of predetermined size to be received within the Teflon tube. The nose has a face or surface 34 and an annular symmetrical recess 36, 38 in the face 32 of the tool from which the nose extends. The annular recess is symmetrical with respect to the nose. As shown in FIG. 2, as the tool is advanced, the extending end zone of the catheter 20 is directed by the advancement of the tool by the surface of the nose and the annular recess 36, 38 to bend back upon itself forming the bight portions indicated by the numerals 40 and 42. The application of the heat as well as the formation of the recess tend to cause the Teflon to take this path as the tool is advanced in the manner described. With continued advancement of the tool, the heat of the tool is conducted through the Teflon and causes the plastic of the end of the sleeve as at 50 and 52 to be formed somewhat as indicated by the numerals 50 and 52 providing an enlarged annular end rim or zone on the plastic of the sleeve. This in turn causes heat to be transferred to the tip end zone of the Teflon material causing it in turn to turn back upon itself as at 60 and 62 after creeping along the exterior surface of the enlarged annular end portion of the plastic, with the result that the inner bight portion 60 and 62 are provided. It is thus seen that this accomplishes a mechanical lock. When the tool 30 has been axially withdrawn, the inturned terminal ends of the Teflon are spaced from the Teflon of the main length of the end zone of Teflon by the thickness of the plastic of the sleeve 16. Thereafter, if desired, the end zone of the Teflon tube, that is the end of the catheter, and the sleeve which is mechanically connected to it, may be positioned in a mold and plastic material caused to flow thereabout as indicated in FIG. 5, forming the body 18 wherein the plastic material of the body 18 bonds with the plastic of the sleeve, which is also plastic, which in turn captivates the Teflon material. The Teflon material could not otherwise be captivated in such a manner because the Teflon does not bond to the plastic. In effect, there is created a simple and inexpensive mechanical lock which is effective for interconnecting Teflon to a plastic body with a through passageway as indicated in FIG. 5.

In the preferred embodiment the exterior diameter of the polypropylene sleeve may be 0.3 inches and the extension of the plastic sleeve from the teflon tube may be about 1/16th of an inch. Additionally, the radius at the base of the nose, that is of the recess, is about 0.02 to about 0.03 inches and the nose extends outwardly to a curved end zone of about 0.05 inches. It will be understood that suitable dimensions may be utilized within the spirit of this invention for causing the teflon to curl back upon a bead which is formed by heat at the end zone of a plastic sleeve so that the teflon curls back upon itself and the plastic forming a mechanical bond. The body which is utilized in the preferred embodiment is of the product known commercially as Shell Craton which is a styrene butaline elastomer, that is, a plastic rubbery material used in molding products.

What is claimed is:

1. The process of insert molding a Teflon tube in a plastic body, comprising the steps of:
    first, holding a Teflon tube in a fixed axial position at a zone spaced from one end of the tube, the space between said zone and said one end of the tube being of a predetermined axial length having a terminal mouth,
    second, positioning a plastic sleeve of predetermined wall thickness closely about said predetermined axial length of said tube, said sleeve being of an axial length less than said predetermined length defining and extending terminal end zone of the Teflon tube.

annular recess symmetrically about said nose with the surface of said nose defining the interior wall of said recess, said annular recess terminating at an edge spaced radially outwardly from said nose a distance greater than the sum of twice the thickness of said tube plus the thickness of said sleeve, said recess being generally semi-circular as seen in an elevation cross sectional view, fourth, advancing the nose of said heated tool into the mouth of the tube to initiate bending of the mouth and extending terminal end zone of the tube back upon itself with the mouth spaced radially outwardly of the tube, fifth, continuing to advance the tool and melting the plastic of the sleeve between the turned back portion of the tube and the wall of the tube forming a relatively thick annular ring of plastic between the Teflon of the turned back portion and the tube, sixth, holding said heated tool in the mouth until the brink end of the mouth portion of the Teflon tube is turned back toward the tube and over the plastic ring at the zone of juncture of the plastic ring and the sleeve to captivate the melted plastic ring of the end of the plastic sleeve between the Teflon, seventh, removing the nose of the heated tool from the tube, eighth, releasing the jaws, and ninth, insert molding and plastic piece about said ring and a portion of said sleeve.

2. The process as set forth in claim 1 wherein the plastic sleeve is of polypropylene.

3. The process as set forth in claim 1 wherein said plastic piece is made of elastomer.

4. The process of claim 3 wherein said elastomer is a styrene-butadiene composition.

5. The process of claim 1 including the steps of releasing jaws holding said tube and molding a plastic piece about said ring and a portion of said sleeve.

6. The process as set forth in claim 5 wherein said insert molding includes the step of forming a passageway in the piece axially aligned with said tube and wherein the outside diameter of the passageway is greater than the inside diameter of the tube and less than the outside diameter of the plastic ring, to captivate the tube against axial displacement relative to the plastic of the piece.

7. The process as set forth in claim 2 wherein the sleeve is of polypropylene.

* * * * *